United States Patent [19]

Harden et al.

[11] Patent Number: 4,595,140
[45] Date of Patent: Jun. 17, 1986

[54] BOOM MOUNTING AND CONTROL ASSEMBLY

[75] Inventors: Russell J. Harden; Jerrell W. Harden, both of Banks, Ala.

[73] Assignee: Allied Products Corporation, Chicago, Ill.

[21] Appl. No.: 604,014

[22] Filed: Apr. 26, 1984

[51] Int. Cl.⁴ .............................................. B05B 1/20
[52] U.S. Cl. .................................................... 239/167
[58] Field of Search ................. 239/163, 164, 166–168, 239/159; 182/2, 63

[56] References Cited

U.S. PATENT DOCUMENTS

| | | |
|---|---|---|
| 3,425,628 | 2/1969 | Reams . |
| 3,514,038 | 5/1970 | McQuinn ............................ 239/168 |
| 3,544,009 | 12/1970 | Schlueter ............................ 239/167 |
| 3,581,993 | 6/1971 | Reams ................................. 239/168 |
| 3,887,132 | 6/1975 | Widmer ............................... 239/166 |
| 4,058,258 | 11/1977 | Rosen et al. . |
| 4,221,353 | 9/1980 | Kuhn et al. ......................... 239/166 |
| 4,427,154 | 1/1984 | Mercil ................................. 239/167 |

Primary Examiner—Joseph F. Peters, Jr.
Assistant Examiner—Michael J. Forman
Attorney, Agent, or Firm—Saidman, Sterne, Kessler & Goldstein

[57] ABSTRACT

An apparatus for controlling the horizontal and vertical orientation of a boom assembly. An elongated frame assembly adapted to be mounted to a vehicle has a cam plate mounted to and moveable therealong. Hydraulic drive means controls the movement of the cam plate between fully extended, intermediate, and fully retracted positions. A hinge plate assembly is rotatably mounted to the frame assembly and an elongated boom, such as an agricultural spray boom, is pivotably mounted to the hinge plate so that the boom is vertically adjustable relative to the ground. The cam plate is adapted to engage the hinge plate and the boom in such a way that when the cam plate is moved along the frame assembly between the fully extended and intermediate positions, it adjusts the boom height relative to the ground and when the cam plate is moved between the intermediate and fully retracted positions, it causes the hinge plate to rotate about its pivot axis, thereby swinging the boom toward and into its retracted (traveling) position.

35 Claims, 11 Drawing Figures

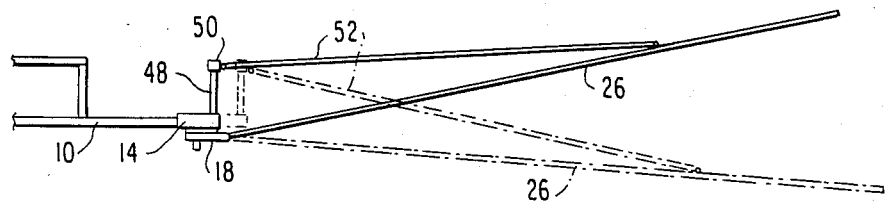
FIG. 4
FIG. 5
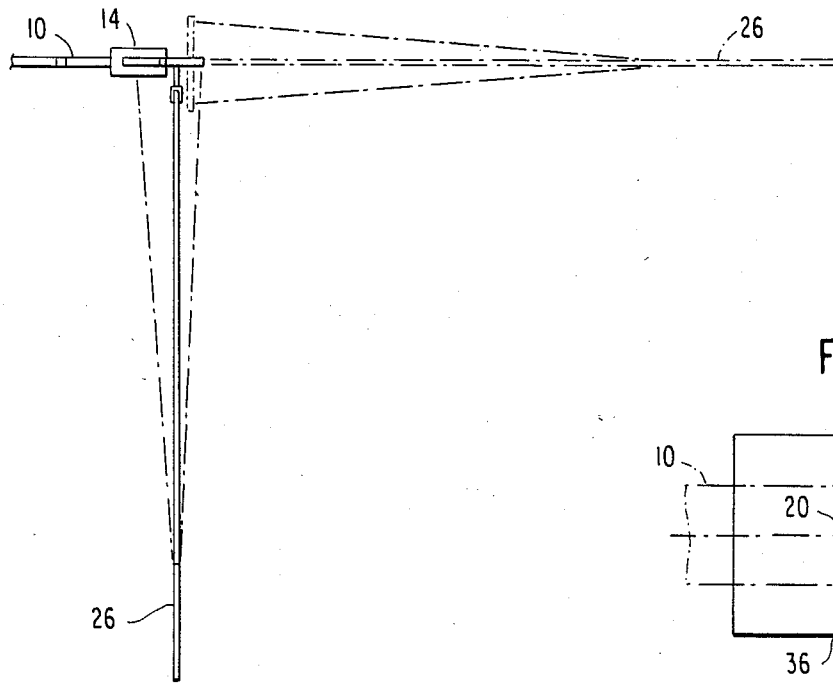
FIG. 9
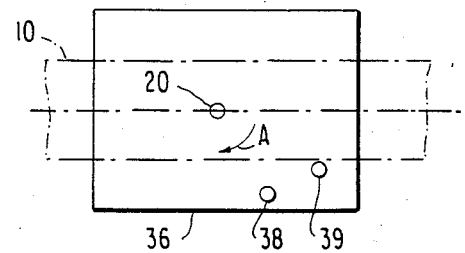
FIG. 3A
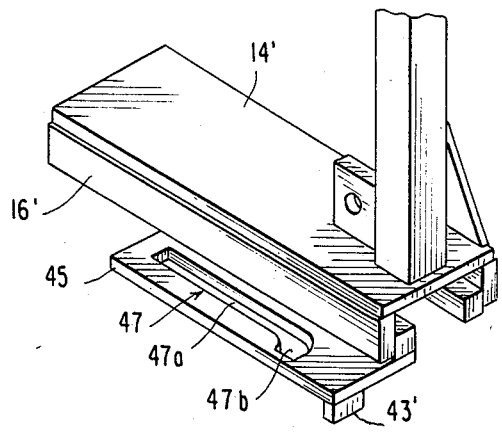
FIG. 3
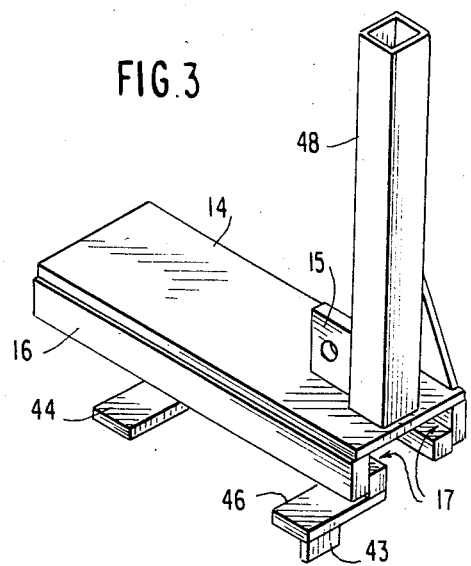

BOOM MOUNTING AND CONTROL ASSEMBLY

BACKGROUND OF THE INVENTION

1. Field of the Invention

This invention relates to boom mounting and control apparatus. More particularly, the invention relates to an apparatus for mounting and controlling the orientation of a boom on a vehicle mounted frame by means of a single hydraulic drive mechanism. The invention is particularly adapted for controlling the operating orientation and extension and retraction of agricultural spray boom assemblies mounted on a tractor by means of a single hydraulic drive on each side.

2. Description of the Prior Art

Agricultural spray booms have been used for a number of years. These booms are generally mounted on a tractor and spray nozzles are positioned along the boom arms. The tractor is then driven across the field as the crops are sprayed. This allows a relatively wide swath to be covered with each pass through the field. Known types of agricultural spray boom assemblies are shown, for example, in U.S. Pat. No. 3,581,993, issued June 1, 1971, to Robert M. Reams and U.S. Pat. No. 3,514,038, issued May 26, 1970 to Alvin E. McQuinn.

Devices of the type shown in the Reams and McQuinn patents use hydraulic mechanisms to either raise and lower the spray boom (Reams) or to longitudinally extend and retract the booms (McQuinn). Other standard hydraulically powered spray booms in the industry utilize one set of hydraulic cylinders to fold the ends of the boom toward the tractor when turning at the ends of a row or when transporting the device from field to field and a second set of hydraulic cylinders to adjust the height of the boom ends to allow for unlevel field conditions. The Reams and McQuinn patents disclose devices that have limited adjustment capability. The other types of known devices which use multiple sets of hydraulic cylinders are costly to manufacture and maintain. Further, the vehicle, such as the tractor, must be equiped with at least four sets of remote cylinders; this is usually not standard equipment on farm tractors.

The present invention provides an apparatus that allows for multiple adjustability of the spray booms while employing only two hydraulic cylinders, one on each side of the tractor. The apparatus of the invention is advantageous in that it can be used with tractors that have as standard equipment two hydraulic take-offs, it is less expensive to manufacture and operate since it only employs two hydraulic drives, and it is easier to operate because only one control lever is needed per side (rather than the two control levers per side required with a four cylinder unit).

SUMMARY OF THE INVENTION

This invention relates to an apparatus for controlling the horizontal and vertical orientation of a boom assembly. An elongated frame assembly is adapted to be mounted to a vehicle, such as a tractor. A cam plate is mounted to and moveable along the frame assembly. Hydraulic drive means coupled to the frame assembly and the cam plate controls the movement of the cam plate between fully extended, intermediate, and fully retracted positions. A hinge plate assembly mounts to the frame assembly by means that substantially prevents longitudinal movement of the hinge plate while permitting rotational movement thereof relative to the frame.

An elongated boom, such as an agricultural spray boom, is pivotably mounted to the hinge plate so that the boom is vertically adjustable relative to the ground. The cam plate is adapted to engage the hinge plate and the boom in such a way that when the cam plate is moved along the frame assembly between the fully extended and intermediate positions, it adjusts the boom height relative to the ground; when the cam plate is moved between the intermediate and fully retracted positions, it causes the hinge plate to rotate about its pivot axis, thereby swinging the boom between its extended (operating) position and its retracted (traveling) position.

BRIEF DESCRIPTION OF THE DRAWING

FIG. 3 is a perspective view of the cam plate of this invention.

FIG. 3A shows a modified cam plate.

FIG. 4 is a side view of the boom control assembly showing the boom in alternate extended (operating) positions.

FIG. 5 is an overhead view showing the boom in retracted (solid line) traveling and extended (dashed line) operating positions.

FIG. 9 shows a top view of the intermediate hinge plate relative to the frame in the boom extended, operating position.

DESCRIPTION OF THE PREFERRED EMBODIMENTS

Figure 1:
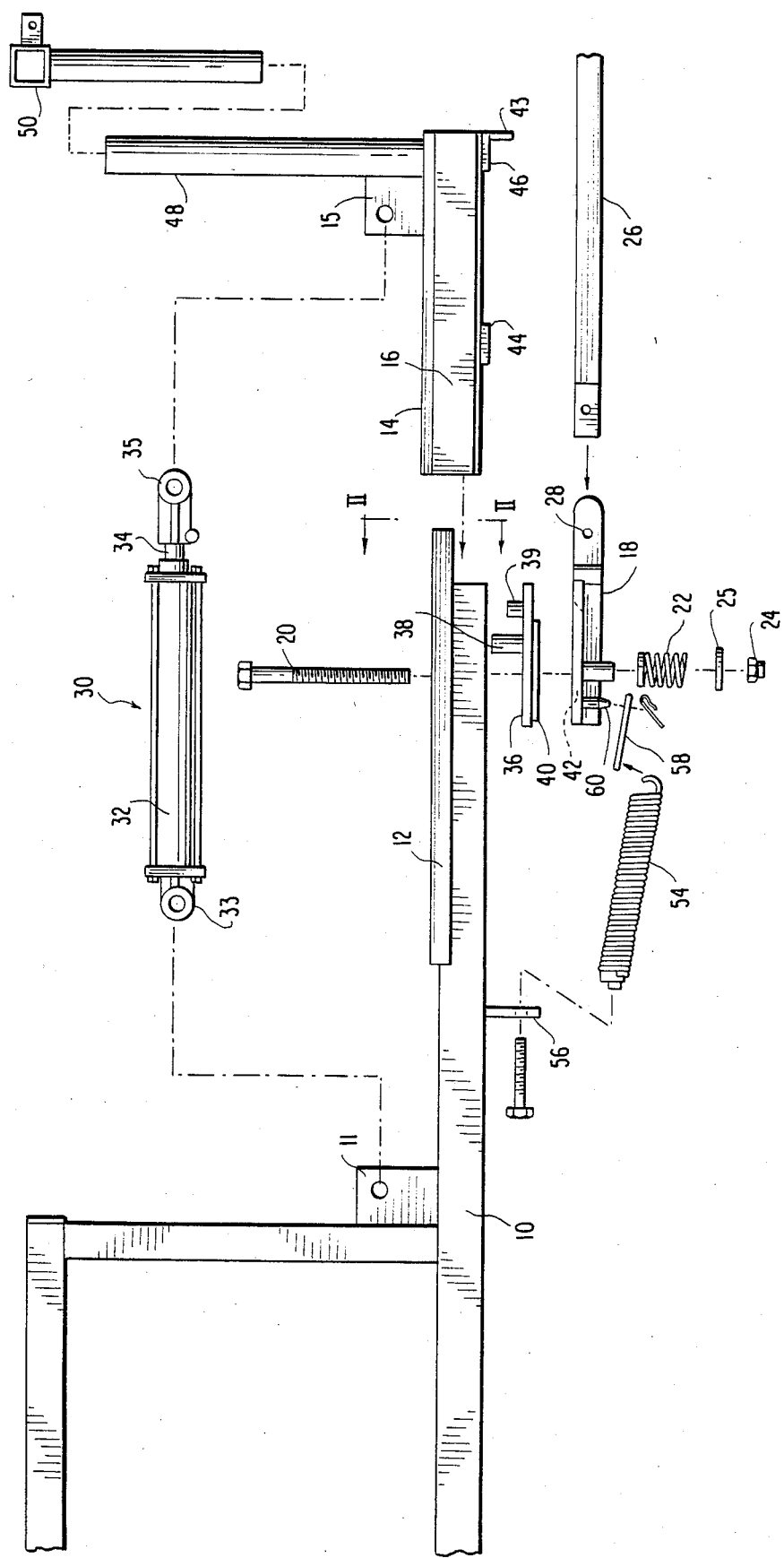
FIG. 1 shows an exploded side view of the boom control assembly of this invention.
Figures 1A, 2:
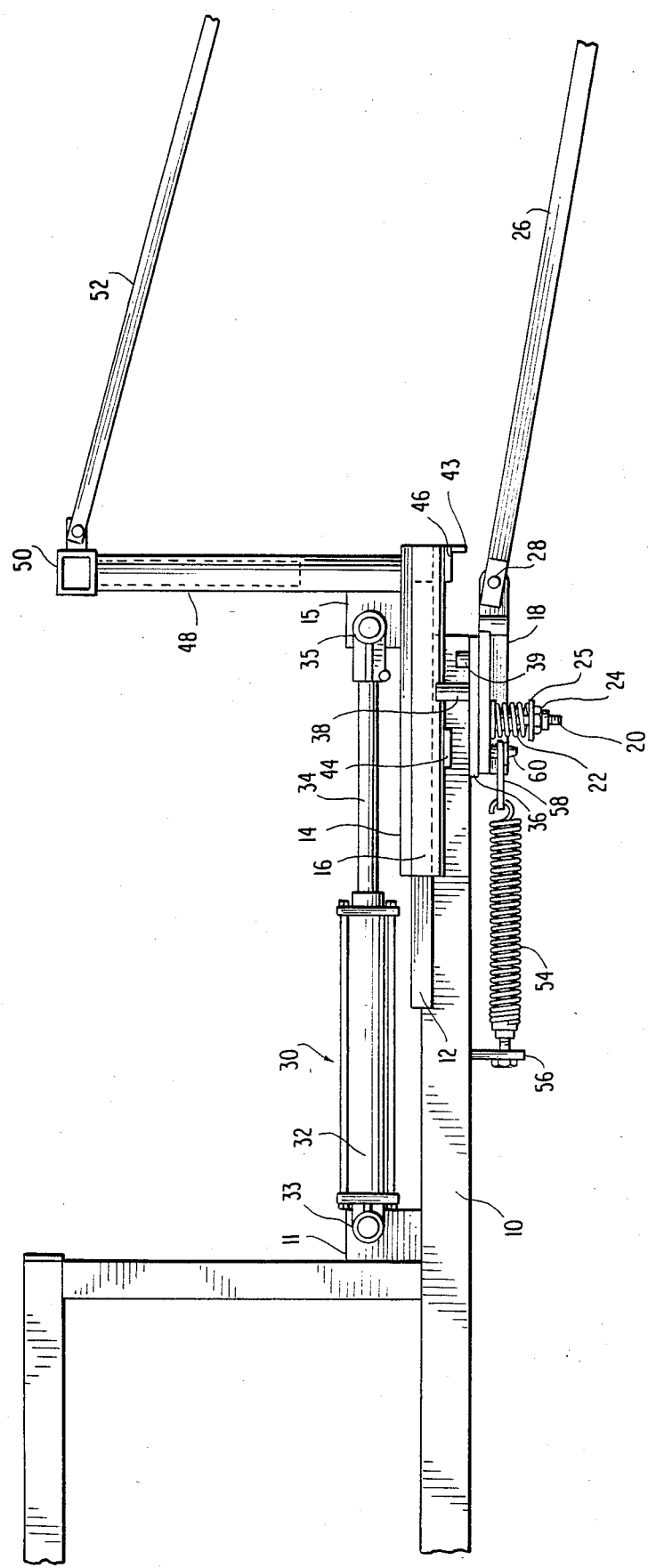
FIG. 1A shows a side view of the boom control assembly of this invention with the components operatively connected.
FIG. 2 shows an end view of the frame taken along the lines II—II in FIG. 1.
Figure 6:
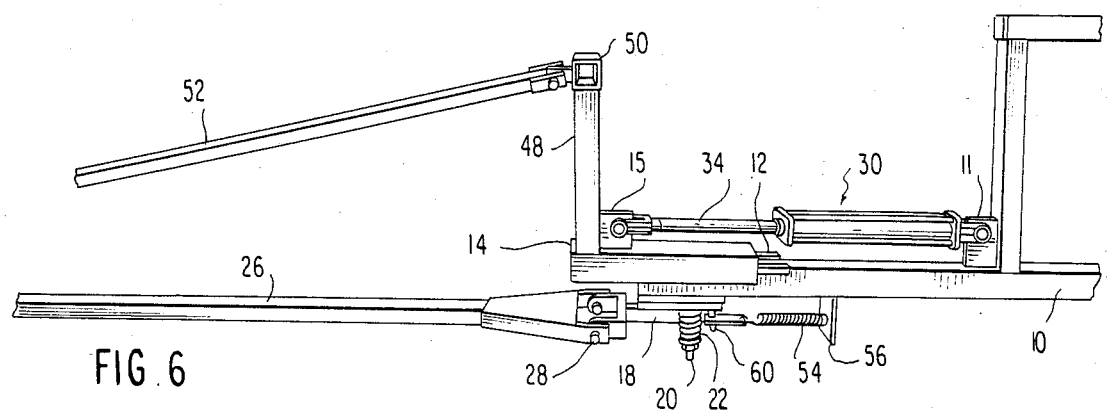
FIG. 6 is a detail view of the control assembly in the boom extended position.

The boom mounting and control assembly of this invention as shown in the drawing and described herein is particularly adapted for use on agricultural equipment. It should be self evident, however, that the invention is not so limited; it would, in fact, be applicable to any boom mounting situation where it is required to both raise and lower the boom assembly and to retract it at times to reduce the overall width of the equipment (usually a vehicle) on which the boom is mounted. The agricultural spray boom assembly described below and shown in the drawing figures depicts only one-half the complete unit. FIGS. 1 and 4–8, for example, all show one side of the complete assembly. The portion shown is mounted to a tractor (not shown but off to the left in FIGS. 1, 4, and 5 and 8).

The boom mounting and control assembly of the invention includes a frame 10, which may be an I-beam or box beam. In the preferred embodiment, a box beam is used to which wings or rails 12 have been added as guideways. A cam plate 14 slideably mounts on frame 10. As seen clearly in FIG. 3, the sides 16 of cam plate 14 extend downwardly and have internal recesses 17 to form guideways for rails 12. Cam plate 14 may thus be securely but slideably mounted on box beam frame 10.

A hinge plate 18 is pivotably mounted to the underside of frame 10. A pivot pin 20 extends through corresponding openings in the hinge plate 18 and frame 10. Surrounding the pin is a spring 22, the compression of which is adjustable by a nut 24 and washer 25 on the end of pivot pin 20. As nut 24 is tightened, spring 22 exerts increasing pressure against hinge plate 18 thereby increasing the friction coupling between the cooperating faces of hinge plate 18 (through plate 36) and frame 10.

A boom 26 is mounted to the hinge plate 18 by a pivot pin 28. The pivot axis represented by pin 28 is substantially orthogonal or perpendicular to the pivot axis represented by pin 20. Thus, boom 26 can pivot relative to hinge plate 18 in the manner shown in FIG. 4. Hinge plate 18 and boom 26 are together capable of rotating about pivot axis 20 relative to frame 10 in the manner shown in FIG. 5.

A hydraulic drive mechanism 30 is composed of a cylinder 32 and piston 34 connected to a source of hydraulic fluid (not shown). The cylinder 32 is secured at one end 33 to a mounting member 11 welded to frame 10; the piston 34 is secured at its free end 35 to a mounting member 15 on cam plate 14. The hydraulic drive 30 is controlled in a known way, such as through a hydraulic fluid control system having a control lever mounted on a panel within reach of the tractor operator. As the piston 34 moves in and out of cylinder 32, it causes cam plate 14 to slide along frame 10 for purposes to be described below.

Hinge plate 18 carries an intermediate plate 36 on which are fixed cam follower pins 38 and 39. Plate 36 has a key or rib 40 that seats in a slot or keyway 42 in plate 18. When the unit is assembled, plate 36 effectively becomes an integral part of hinge plate 18. Obviously, if manufacturing techniques permit or desire, pin 38 could be fitted and fixed directly to the upper surface of plate 18 without intermediate plate 36.

When the apparatus is fully assembled, pin 38 lies between and in the path of movement of two cam fingers 44 and 46 that are welded or otherwise securely fixed to the bottom of side face 16 of the cam plate and extend laterally outwardly from the cam plate as shown in FIG. 3. Engagement of pin 38 by one or the other of cam fingers 44 and 46 causes a rotational movement of cam plate 18, and thus boom 26, about pivot axis 20 in the manner described in more detail below. Pin 39 engages an extension 43 of cam finger 46 only when plates 18 and 36 have been rotated into a "boom retracted" position by the action of cam finger 46 against pin 38.

A variation of the multiple cam finger embodiment is shown in FIG. 3A. Here, the cam plate 14' has a downwardly extending side face 16', as in the above described embodiment. However, instead of cam fingers 44, 46, the modified version has a plate 45 having a substantially "J"-shaped slot or guideway formed therein. Pin 38 seats in guideway 47. Pin 39 lies beneath plate 45 and engages an extension plate 43' at the front of plate 45 only when hinge plate 18 has been rotated into the "boom retracted" position. The effective operation of cam plate 14' is essentially the same as that of cam plate 14.

In the embodiment shown, cam plate 14 is coupled to boom 26 in the following way. A socket member 48 is welded or otherwise secured to the front end portion of cam plate 14. A boom support member 50 seats in socket member 48 in a way that allows boom support member 50 to rotate about its longitudinal axis within socket member 48. A support cable or rigid rod 52 (shown in FIG. 4) extends from the upper part of boom support member 50 to an outer end portion of boom 26.

Finally, a hinge plate bias spring 54 has one end fixed to a support member 56 which in turn is welded or otherwise securely fastened to frame 10. The other end of bias spring 54 is coupled through a coupler bar 58 and coupling pin 60 to hinge plate 18. Spring 54 biases hinge plate 18 toward the "boom extended" or operating position, as will be discussed in more detail below.

The apparatus of this invention operates in the following way. Cam plate 14 is slidable along rails 12 of frame 10 under the control of hydraulic cylinder mechanism 30. Cam plate 14 is movable between a fully extended piston position (shown in FIG. 6) and a fully retracted piston position (shown in FIG. 7). In the fully extended piston position, cam plate 40 is at the outermost reach of travel along rails 12. In this position, follower pin 38 will lie between cam fingers 44 and 46 close to or adjacent finger 44. Pin 39 rests in front of pin 38 adjacent the frame 10. Cam finger 44, acting against pin 38, in combination with the force of bias spring 54, causes hinge plate 18 to pivot about pivot axis 20 toward and into the boom extended position (shown in dashed line in FIG. 5). When cam plate 14 is in its first, or outermost position, boom 26 will rest in its lowest operating position (as shown in dashed line in FIG. 4). From this first, outermost position of cam plate 14, the hydraulic mechanism may be activated by the vehicle operator to draw piston 34 into cylinder 32. This action causes cam plate 14 to slide inwardly (toward the left in FIG. 1) toward a second, intermediate position with cam finger 46 lying adjacent cam follower pin 38. The movement of cam plate 14 between the first, outermost position and the second, intermediate position (also along leg 47a in the variation shown in FIG. 3A) does not affect the lateral orientation of the boom. That is, movement of cam plate 14 between its first and second positions does not impart any pivot forces to cam follower pin 38; thus hinge plate 18 remains biased by spring 54 to maintain boom 26 in the extended position.

Movement of cam plate 14 between its first and second positions does, however, affect the vertical orientation of boom 26. As cam plate 14 is moved inwardly from its outermost position to its intermediate position, boom 26 pivots about its pivot axis 28 and is raised from its lowermost position to its uppermost position (shown in solid line in FIG. 4; see also FIG. 8). Of course, it is contemplated that the movement of cam plate 14 may be stopped at any point between its outermost and intermediate positions to thereby permit adjustment of boom 26 to any desired operating height between its lowermost and uppermost positions.

Figure 7:
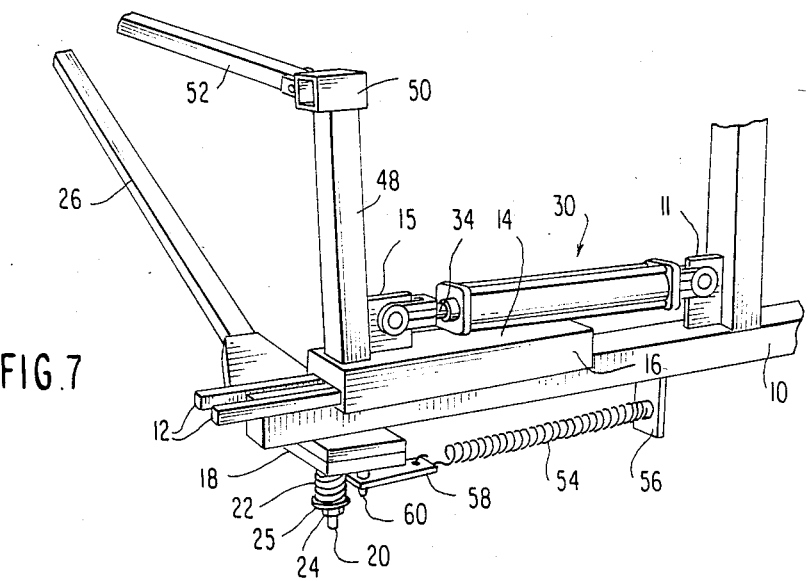
FIG. 7 is a detail view of the control assembly in the boom retracted position.
Figure 8:
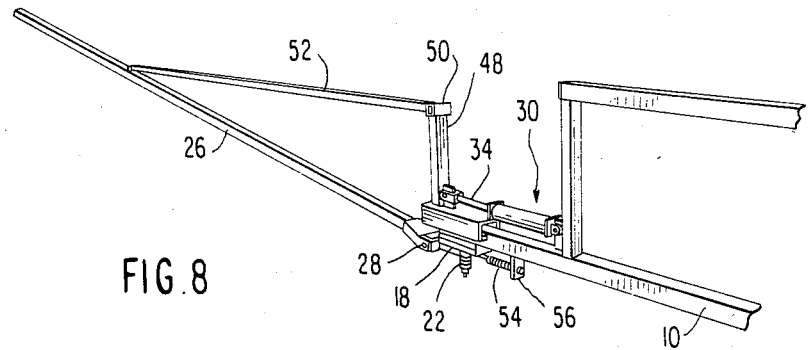
FIG. 8 is a view of the control assembly with the boom in a raised operating position.

When the hydraulic drive mechanism 30 is again activated to withdraw piston 34 fully into cylinder 32, cam plate 14 thereby slides along rails 12 from its intermediate second position to a third, innermost position (shown in FIG. 7). As cam plate 14 slides along rails 12 between its second and third positions, cam finger 46 engages cam follower pin 38. As cam plate 14 continues to move from its second to its third positions, cam finger 46 acts on follower pin 38 and imparts a rotational force sufficient to overcome the biasing force of spring 54. (Similarly, in FIG. 3A, pin 38 follows the path of leg 47b.) Hinge plate 18 is thereby caused to rotate about pivot axis 20 (in the direction of arrow A in FIG. 9) and to thereby rotate boom 26 from its extended operating position (shown in dashed line in FIG. 5) to its retracted traveling position (shown in solid line in FIG. 5). At the same time pin 39 is rotated about pivot axis 20 to come to rest in front of extension plate 43 (or 43'). Boom 26 will remain in its retracted position as long as cam finger 46 continues to bear on follower pin 38.

To return to the "boom extended" operating position, the operator activates the hydraulic drive mechanism 30 to force piston 34 out of cylinder 32. This causes cam plate 14 to slide on rails 12 outwardly (toward the right in FIG. 1) along frame 10. As cam plate 14 slides from its third, innermost position to its second, intermediate position, the force applied by cam finger 46 on follower pin 38 is decreased. Extension plate 43 (or 43') engages pin 39 to urge, together with the force of bias spring 54, hinge plate 18 into rotation toward the "boom extended" position. At an intermediate rotation point, pin 39 slides off plate 43; finger 44 engages pin 38 to continue moving hinge plate 18 toward and into the "boom extended" position. Thus, as cam plate 18 is moved from its third, fully retracted position to its second, intermediate position (in the absence of bias spring 54), cam finger 44 urges pin 38, hinge plate 18 and boom 26 toward and into "boom extended" operating position. As cam plate 14 continues to move outwardly under the force of expanding piston 34 from its intermediate, second position to its outermost first position, boom 26 (which is now in its fully extended, operating position) is lowered to its desired operating height.

As can be seen from the foregoing, the present invention provides a substantial advantage over known apparatus which requires the use of multiple hydraulic mechanisms or combinations of hydraulic, electric and manual operations to both adjust the boom operating height and boom extension and retraction (e.g., for operating and traveling modes, respectively).

This invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes which come within the meaning and range of equivalency of the claims are therefore intended to be embraced herein.

What is claimed is:

1. Apparatus for controlling the orientation of a boom assembly, comprising:
   an elongated frame assembly adapted to be mounted to a vehicle;
   cam plate means coupled to and movable along said frame assembly;
   hinge plate means mounted to said frame assembly for rotational movement relative to said frame assembly;
   elongated boom means coupled to said hinge plate means for pivotal movement relative to said hinge plate means;
   means coupling said cam plate means to said boom means and to said hinge plate means; and
   drive means coupled to said cam plate means for controlling movement of said cam plate means along said frame assembly;
   wherein when said cam plate means is moved by said drive means along said frame assembly between a first position and a second position, said cam plate means causes said boom means to move in a first direction, and when said cam plate means is moved by said drive means along said frame assembly between said second position and a third position remote from said first position, said cam plate means causes said boom means to move in a second direction substantially perpendicular to said first direction.

2. Apparatus according to claim 1, wherein said drive means comprises a hydraulic cylinder and piston, fixed at one end portion to said frame assembly and at the other to said cam plate means, such that movement of said piston in said cylinder controls the movement of said cam plate means between said first and second positions and between said second and third positions.

3. Apparatus according to claim 2, wherein said means coupling said cam plate means with said hinge plate means includes a pin member fixed to said hinge plate means for engagement with said cam plate means when said cam plate means moves between said second and third positions, to thereby urge said pin member into movement to rotate said hinge plate means and said boom means relative to the frame assembly.

4. Apparatus according to claim 3, wherein said means mounting said hinge plate means to said frame assembly includes an elongated pivot pin extending through cooperating openings in said frame assembly and said hinge plate means, and bias means cooperating with said pivot pin to adjust the rotational tension applied to said hinge plate means.

5. Apparatus according to claim 3, wherein:
   said cam plate means has guide opening formed therein; and
   said means coupling said cam plate means to said hinge plate means includes a follower pin fixed to said hinge plate means and disposed in said guide opening.

6. Apparatus according to claim 5, wherein said means coupling said cam plate means to said boom means comprises a boom support member mounted to and rotatable relative to said cam plate means, and support rod means extending from said boom support member to an outer end portion of said boom means.

7. Apparatus according to claim 3, wherein said cam plate means includes at least one lateral projection, said pin member extending from the hinge plate means so as to lie in the path of movement of said lateral projection; such that when said cam plate means is moved from its second position to its third position, said lateral projection engages said pin member to urge said pin member into movement and to thereby rotate said hinge plate means relative to the frame assembly.

8. Apparatus for controlling the orientation of a boom assembly, comprising:
   a frame assembly adapted to be mounted to a vehicle;
   movable means coupled to said frame assembly for movement along and pivotally relative to said frame assembly;
   a boom coupled to said movable means; and
   single drive means coupled to said movable means for controlling movement of said movable means along said frame assembly among a first, end position, a second, intermediate position, and a third, end position spaced from said first position;
   wherein, when said movable means is moved by said drive means between said first and second positions, said boom is caused to pivot in a first direction, and when said movable means is moved by said drive means between said second and third positions, said movable means causes said boom to move in a second direction substantially perpendicular to said first direction.

9. Apparatus according to claim 8, wherein said movable means comprises a first movable means coupled to said frame assembly for movement therealong, and a second movable means coupled to said frame assembly for pivotal movement relative to said frame assembly.

10. Apparatus according to claim 9, wherein said boom is coupled to said second movable means for pivotal movement relative to said second means.

11. Apparatus according to claim 10, further comprising means coupling said first movable means to said boom.

12. Apparatus according to claim 10, wherein said drive means is coupled to said first movable means for controlling movement of said first movable means along said frame assembly among said first, second, and third positions.

13. Apparatus according to claim 12, wherein when said first movable means is moved between said first and second positions, said boom is caused to pivot in said first direction relative to said second movable means, and when said first movable means is moved between said second and third positions, said first movable means engages said second movable means to thereby move said boom in said second direction substantially perpendicular to said first direction.

14. Apparatus according to claim 13, wherein said first movable means comprises a cam plate and said second movable means comprises a hinge plate.

15. Apparatus according to claim 14, further comprising means coupling said hinge plate to said frame assembly for rotational movement of said hinge plate while substantially preventing longitudinal movement of said hinge plate relative to said frame assembly.

16. Apparatus according to claim 15, further comprising means pivotably coupling said boom to said hinge plate.

17. Apparatus according to claim 16, further comprising means coupling said cam plate to said boom and to said hinge plate.

18. Apparatus according to claim 17, wherein said drive means comprises a hydraulic cylinder and piston, fixed to said frame assembly and to said cam plate, such that movement of said piston in said cylinder controls the movement of said cam plate between said first and second positions and between said second and third positions.

19. Apparatus according to claim 18, wherein said means coupling said cam plate with said hinge plate includes a pin member fixed to said hinge plate for engagement with said cam plate when said cam plate moves between said second and third positions, to thereby urge said pin member into movement to rotate said hinge plate and said boom relative to the frame assembly.

20. Apparatus according to claim 19, wherein said means mounting said hinge plate to said frame assembly includes an elongated pivot pin extending through cooperating openings in said frame assembly and said hinge plate, and bias means cooperating with said pivot pin to adjust rotational tension applied to said hinge plate.

21. Apparatus according to claim 20, wherein said cam plate has a guide opening formed therein; and said means coupling said cam plate to said hinge plate includes a follower pin fixed to said hinge plate and disposed in said guide opening.

22. Apparatus according to claim 21, wherein said means coupling said cam plate to said boom comprises a boom support member rotatably mounted relative said cam plate, and a support rod means extending from said boom support member to an outer end portion of said boom.

23. Apparatus according to claim 22, wherein said cam plate includes at least one lateral projection, said pin member extending from the hinge plate so as to lie in the path of movement of said lateral projection; such that when said cam plate is moved from its second position to its third position, said lateral projection engages said pin member to urge said pin member into movement and to thereby rotate said hinge plate means relative to the frame assembly.

24. Apparatus for controlling the orientation of a boom assembly, comprising:
a frame assembly adapted to be mounted to a vehicle;
first movable means coupled to said frame assembly for movement therealong;
second movable means pivotably coupled to said frame assembly;
a boom coupled pivotably to said second movable means;
means coupling said first movable means to said boom; and
drive means coupled to said first movable means for controlling movement of said first movable means along said frame assembly among a first, end position, a second, intermediate position, and a third, end position;
wherein, when said first movable means is moved between said first and second positions, said boom is caused to pivot in a first direction relative to said second movable means, and when said first movable means is moved between said second and third positions, said first movable means engages second movable means to thereby move said boom in a second direction substantially perpendicular to said first direction.

25. Apparatus according to claim 24, wherein said first movable means comprises a cam plate and said second movable means comprises a hinge plate.

26. Apparatus according to claim 25, further comprising means coupling said hinge plate to said frame assembly for rotational movement of said hinge plate while substantially preventing longitudinal movement of said hinge plate relative to said frame assembly.

27. Apparatus according to claim 26, further comprising means pivotably coupling said boom to said hinge plate.

28. Apparatus according to claim 27, further comprising means coupling said cam plate to said boom and to said hinge plate.

29. Apparatus according to claim 28, wherein said drive means is coupled to said cam plate for controlling movement of said cam plate along said frame assembly among said first, end position said second, intermediate position, and said third, end position.

30. Apparatus according to claim 29, wherein said drive means comprises a hydraulic cylinder and piston, fixed to said frame assembly and to said cam plate.

31. Apparatus according to claim 30, wherein said means coupling said cam plate with said hinge plate includes a pin member fixed to said hinge plate for engagement with said cam plate when said cam plate moves between said second and third positions, to thereby urge said pin member into movement to rotate said hinge plate and said boom relative to the frame assembly.

32. Apparatus according to claim 31, wherein said means mounting said hinge plate to said frame assembly includes an elongated pivot pin extending through cooperating openings in said frame assembly and said hinge plate, and bias means cooperating with said pivot pin to adjust the rotational tension applied to said hinge plate.

33. Apparatus according to claim 32, wherein: said cam plate has a guide opening formed therein; and said means coupling said cam plate to said hinge plate includes a follower pin fixed to said hinge plate and disposed in said guide opening.

34. Apparatus according to claim 33, wherein said means coupling said cam plate to said boom comprises a boom support member rotatably mounted relative to said cam plate, and a support rod means extending from said boom support member to an outer end portion of said boom.

35. Apparatus according to claim 34, wherein said cam plate includes at least one lateral projection, said pin member extending from the hinge plate so as to lie in the path of movement of said lateral projection; such that when said cam plate is moved from its second position to its third position, said lateral projection engages said pin member to urge said pin member into movement and to thereby rotate said hinge plate means relative to the frame assembly.

* * * * *